United States Patent [19]

Gross

[11] Patent Number: 4,773,956
[45] Date of Patent: Sep. 27, 1988

[54] PROCESS FOR CONNECTING BODIES HAVING HOLLOW SECTIONS TO MOLDED BODIES MADE OF THERMOPLASTIC

[75] Inventor: Heinz Gross, Muehltal, Fed. Rep. of Germany

[73] Assignee: Rohm GmbH Chemische Fabrik, Darmstadt, Fed. Rep. of Germany

[21] Appl. No.: 937,087

[22] Filed: Dec. 2, 1986

[30] Foreign Application Priority Data

Dec. 7, 1985 [DE] Fed. Rep. of Germany ....... 3543283

[51] Int. Cl.$^4$ ...................... B32B 31/04; B32B 31/26
[52] U.S. Cl. ................................. 156/294; 156/296; 156/303.1; 156/308.4; 264/248; 264/263
[58] Field of Search ............... 156/293, 296, 283, 294, 156/83, 198, 172, 303.1, 308.4, 308.2, 250, 252, 256, 196; 165/69, 79, 173, 178; 264/248, 263, 329; 425/384

[56] References Cited

U.S. PATENT DOCUMENTS 3,841,938 10/1974 Grosse-Holling ................... 156/293
4,588,543 5/1986 Huebner ............................. 264/248

FOREIGN PATENT DOCUMENTS 1183520 3/1985 Canada .
2657468 6/1978 Fed. Rep. of Germany .
3008055 9/1981 Fed. Rep. of Germany .

Primary Examiner—Merrell C. Cashion, Jr.
Attorney, Agent, or Firm—Oblon, Fisher, Spivak, McClelland & Maier

[57] ABSTRACT

Bodies having hollow sections and made of thermoplastic are tightly connected in the front to a molded body of a thermoplastic weldable thereto. The front end piece of each hollow sectioned body is introduced into a corresponding open recess molded in the molded body and having inside dimensions matching the front section of the hollow sectioned body so that the end piece of the hollow sectioned body rests against the wall of the recess. The front side and the edge are then welded to one another on their entire periphery, preferably by sinking into a groove of a welding tool shaped to correspond to the common edge.

12 Claims, 2 Drawing Sheets

PROCESS FOR CONNECTING BODIES HAVING HOLLOW SECTIONS TO MOLDED BODIES MADE OF THERMOPLASTIC

FIELD OF THE INVENTION

The invention relates to a process for connecting a body having a hollow section and made of thermoplastic to a thin-walled molded body made of a thermoplastic weldable to the first body. In the making of such connections, the problem arises of producing a gas- and liquid-tight connection with simple means. This requirement arises, for example, in the case of connecting heat exchanger pipes or surfaces to collecting tanks and in the case of connecting plastic pipes to a hollow body made of plastic.

BACKGROUND OF THE INVENTION

U.S. Pat. No. 4,114,597 describes the connection of a web plate made of plastic, which serves as a solar collector surface, to a collecting pipe. The collecting pipe consists of an extruded section. The extruded section has a lateral slot into which the front end of the web plate is introduced so that the hollow space inside the web plate ends inside the collecting pipe. The front end of the web plate must be fastened in the slot of the collecting pipe by means of a sealing adhesive, which entails a considerable expenditure of labor. Sealing of the slot of the collecting pipe on the lateral edges of the web plate requires additional measures.

DE-A No. 26 57 468 proposes a plug connection in which a collecting pipe with lateral pipe sockets is introduced into the front side of a web plate so that each of the pipe sockets ends in a hollow chamber of the web plate to sheath and thus seal the hollow chamber with a thick-walled plastic layer. As a result, a great material requirement for the sheathing/sealing compound arises.

According to DE-A No. 30 08 055, a collecting pipe is formed on the front side of a web plate by extrusion. For production of the collecting pipe duct, a core piece is inserted and drawn according to the extrusion process. For the process a special extrusion device is required. The special extrusion device is connected to a transport device for the web plate. Since the drawing of the core piece often causes difficulties, it is proposed in German utility model No. 79 27 236, instead of the core piece, to place a thin-walled collecting pipe with lateral connecting sleeves on the front side of the web plate and then to cover the front end of the web plate and the collecting pipe by an extruded plastic layer.

OBJECT OF THE INVENTION

The object of the invention is to find an improved process for front sealed connecting of a body having a hollow section and made of thermoplastic to a thin-walled molded body made of a thermoplastic weldable to the first body which does not exhibit the disadvantages of the known processes. The process is to be simple—i.e., able to be embodied without resorting to complicated devices and without the use of additional materials such as glues or sealing materials. It is to be versatile, and it should permit the connection of hollow section bodies shaped in any way (e.g., pipes or web plates) to thin-walled molded bodies. Further, it is to be possible to connect a multiplicity of like or different hollow sectioned bodies to a plastic molded body. In any case, a completely sealed connection is required.

ADVANTAGE OF THE INVENTION

The objects are attained by the process disclosed herein. In view of the multiplicity of known proposed solutions, it is surprising that a solution could be found which, in comparison with the prior art, is distinguished not only by a reduced consumption of material and labor, but also is superior to the known processes in versatility.

INDUSTRIAL APPLICATION OF THE INVENTION

The process according to the invention can be used with special advantage for the production of heat exchangers. For this purpose, a multiplicity of pipe- or flat-shaped exchange elements can be connected to a collecting tank or to an element of such a collecting tank. In the same way, connecting lines can be connected to the collecting tank or its assembly elements.

DETAILED DESCRIPTION OF THE PRESENTLY PREFERRED EMBODIMENTS

In the process according to the invention, a hollow sectioned body to be connected to a plastic molded body must have at least on its front side an end piece with constant cross-section. The sides of the hollow sectioned body on which the hollow spaces end toward the outside are identified as front sides. The end piece with constant cross section must have a length at least sufficient to be inserted into the matching recess in the molded body and to be welded to the molded body. As a rule, a length of 5–20 mm is sufficient for this purpose. The cross section of the hollow sectioned body can change in any way beyond this end piece. In practice, hollow sectioned bodies produced by extrusion, and having a constant cross section over the entire length (e.g., pipes or web plates), are particularly important. The pipes can, for example, have a round or polygonal cross section. Suitable web plates preferably consist of two parallel outside walls and a multiplicity of webs that connect the outside surfaces inside the web plate and on their lateral edges together in one piece. The wall thickness of the end piece to be connected is preferably in the range of 0.5–5 mm. The hollow sectioned body can consist of a block consisting of a multiplicity of hollow sectioned elements previously welded or glued to one another on the front side. In this case, the hollow sectioned body can be connected to a molded body in the area of its outside edge.

As a rule, the hollow sectioned body is delimited by a front surface which is at right angles to the walls of the end piece. However, the invention also allows the connection of end pieces cut at an oblique angle.

The thin-walled molded body to which the hollow sectioned body is connected can have about the same wall thickness as the hollowed sectioned body. Preferably, the wall thickness is 0.5 to 2 times the wall thickness of the hollow sectioned body. As a rule, the molded body is designed flat with a basically uniform wall thickness in the area where the hollow sectioned body is connected.

Figure 1:
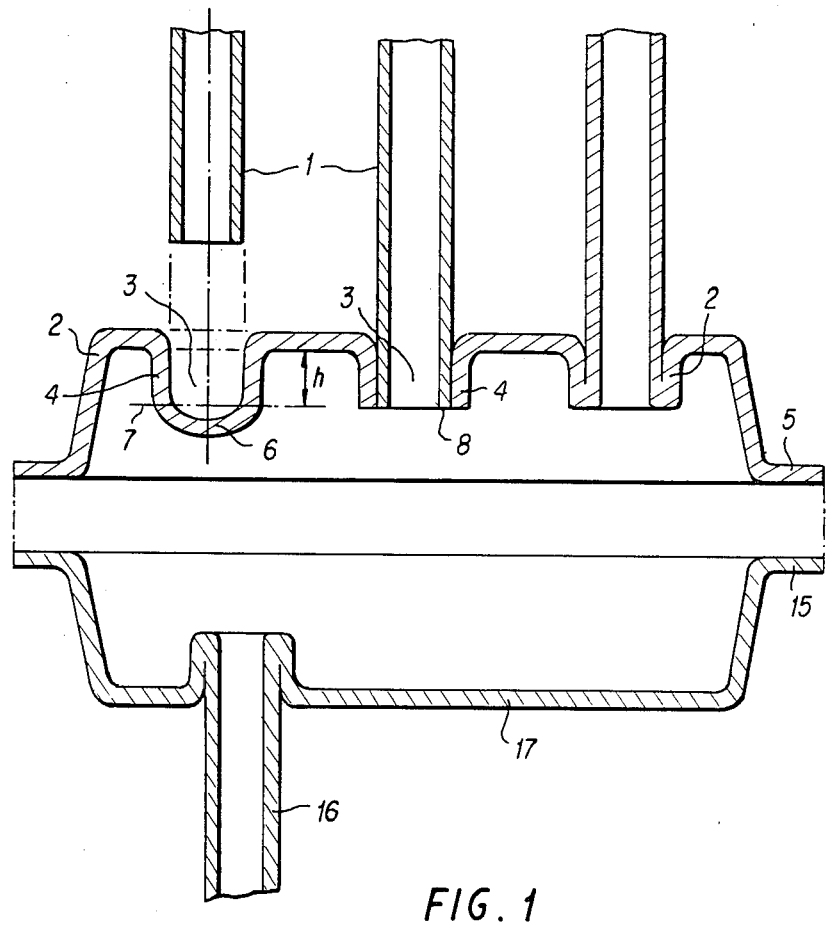
FIG. 1 is a cross-sectional view through two halves of a collecting tank and the exchange body to be connected of a heat exchanger in various process steps.

Turning to FIG. 1, a plurality of hollow sectioned bodies 1 are shown in various steps of being connected to a molded body 2. The molded body 2 contains one or more recesses 3 having a constant cross section the inside dimensions (i.e., the cross section) of which are matched to the front section of the corresponding hollow sectioned body 1. Each recess 3 is formed by a cantilevered edge 4 projecting from the wall of the molded body 2. Each cantilevered edge 4 is so shaped that the inserted end of the corresponding hollow sectioned body 1 fits in it as precisely as possible. However, the process of the invention allows a tolerance of up to about 1 mm between the inside dimensions of each recess 3 and the outside dimensions of the corresponding hollow sectioned body 1. The cantilevered edges 4 advantageously have a height of about 5–20 mm.

The recesses 3 can be produced simultaneously with the production of the molded body 2—for example, if an injection molding process is used for this purpose. The same applies if the molded body is produced by deformation of a planar plastic plate. Thus, simultaneously with a flange edge 5 or other molded elements, a multiplicity of recesses 3 can be produced.

Initially, the recesses 3 are closed at their bases by plastic surfaces 6. By cutting off the surfaces 6 (for example, with a cutter), the recesses are opened along a plane 7.

Correspondingly, one or more recesses 3 can later be molded in an already shaped molded body 2 by the molded body 2 being heated locally at these places to deformation temperature and the recess 3 being molded by a suitable tool. For the production of a round recess 3, open at the bottom, a hole is first punched or drilled in the surface of the molded body 2. After heating to deformation temperature, a conical tool is pressed through the hole. The conical tool changes into a shaft of the cross-section of the hollow body to be connected. Thus, the hole is expanded to the thickness of the shaft. At the same time, the cantilevered edge 4 is formed.

For production of a sealed connection, the front end of each hollow sectioned body 1 is introduced into a corresponding recess 3 so that the front side of the hollow sectioned body 1 forms a common edge 8 with the end of the cantilevered edge 4. The external periphery of the end of the hollow sectioned body at least approximately matches the internal periphery of the open bottomed recess. It is advantageous if the common edge 8 is precisely in a plane, but generally deviations up to about 1 or 2 mm are tolerable.

The sealed connection is now produced by the plastic parts lying on one another on the common edge 8 being heated to the melting temperature and welded to one another on their entire periphery. After cooling below the softening temperature, a sealed, mechanically solid connection exists.

Figure 2:
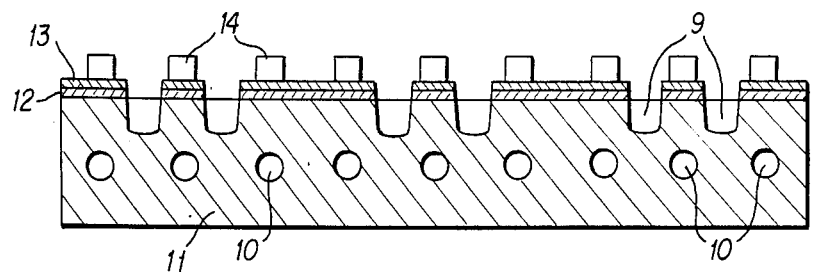
FIG. 2 is a cross-sectional view through the tool used for the production of the heat exchanger element according to FIG. 1.
Figure 3:
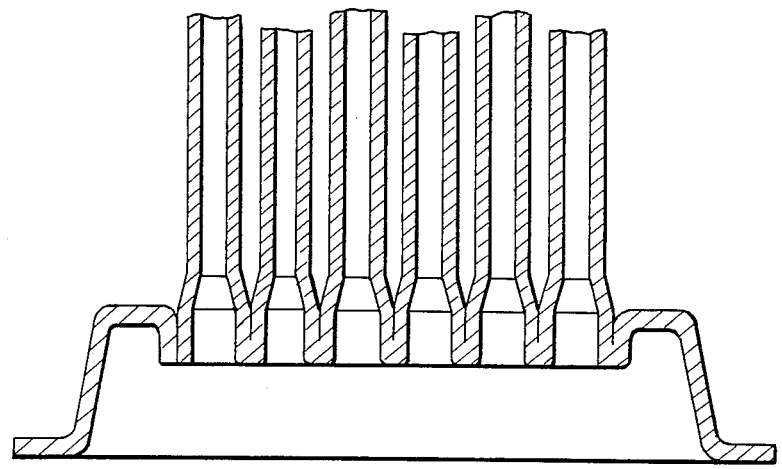
FIG. 3 is a cross-sectional view through a block formed from several hollow sectioned elements and through a molded body to be connected to it.

The welding can be produced by a heating zone going along the common edge 8. Preferably the entire edge 8 is heated and welded at the same time. If several hollow sectioned bodies 1 are to be attached to a molded body 2, they are preferably welded together at the same time. The tool shown in FIG. 2 can be used for this purpose. (A similar tool is disclosed in commonly assigned U.S. application Ser. No. 874,649, filed June 21, 1986, the disclosure of which is hereby incorporated herein by reference.) It contains grooves 9 the internal dimensions of which are matched to the the external dimensions of the cantilevered edges 4 that are to be welded to the edges 8. Preferably, the grooves 9 on the entry side are somewhat wider than on the base and are slightly broader than the edges 4 so that the edges 4 can easily be introduced into the grooves 9. By a heating and cooling system 10 located in a base part 11 of the tool, the tool can be heated in the area of the grooves 9 to the melting temperature of the plastic. After introduction of the edges 4 and 8 into the grooves 9, the plastic melts and is welded by pressure of the tool on the edges 4 and 8. With the bearing pressure, the molten plastic can ascend in the groove 9 alongside the inserted plastic parts. The rising melt is brought to solidifcation and prevented from leaving the grooves 9 by a conductive layer 13 made of a good heat conductive material (e.g., metal) that is thermally insulated from the base part 11 by an insulating layer 12. If necessary, the conductive layer 13 is kept under the melting temperature of the plastic by a coolant flowing through ducts 14. After melting of the plastic parts, the base part 11 is cooled, and the tool is removed after cooling of the welding site below the softening temperature of the plastic.

To produce a closed collecting tank, a second plastic body 17 can be produced with a flange edge 15 that matches the flange edge 5 of the first molded body 2. A connecting pipe 16 can be connected to the second molded body 17 by the process of the invention. A closed collecting tank is made by putting together and welding, screwing, or clamping together the flange edges 5 and 15.

A prerequisite for the weldability of the hollow sectioned bodies 1 to the molded body 2 is the weldability of the plastics used for their production. Both must be meltable and so compatible with one another that (1) the melts adequately unite with one another on the contact surface and (2) after cooling, a permanent welding connection continues to exist. This prerequisite is met particularly well if the hollow sectioned bodies 1 are made of the same plastic as the molded body 2. Differences in dyes or in other usual additives as a rule are not an obstacle to the welding of plastics that otherwise are the same.

All thermoplastically workable plastics of adequate rigidity and resistance to deformation are suitable. Examples are polyethylene, polypropylene, polystyrene, polymethyl methacrylate, polyvinyl chloride, polycarbonate, thermoplastic polyester, polyoxymethylene, polyamides, and polysulfones.

In many cases, different plastics can be welded to one another permanently. In this connection, the following pairs are included:
methyl methacrylate—polyvinyl chloride
polymethyl methacrylate—acrylonitrile-butadiene-styrene plastics
polyvinyl chloride—acrylonitrile-butadiene-styrene plastics
polycarbonate—acrylonitrile-butadiene-styrene plastics
polyurethane—polyamide Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A process for connecting a hollow sectioned body made of thermoplastic to a molded body made of thermoplastic weldable to the hollow sectioned body, said process comprising the steps of:
   (a) forming in the molded body an open bottomed recess:
      (i) having a constant cross section;
      (ii) having a cantilevered edge projecting from the wall of the molded body; and
      (iii) the inside dimensions of which at least approximately match the outside dimensions of an end of the hollow sectioned body having a constant cross section; then
   (b) introducing the end of the hollow sectioned body into the open bottomed recess in the molded body so that:
      (i) the end of the hollow sectioned body forms a common edge with the open bottom of the open bottomed recess and
      (ii) the external periphery of the end of the hollow sectioned body at least approximately matches the internal periphery of the open bottomed recess; and then
   (c) welding the end of the hollow sectioned body and the bottom of the open bottomed recess together around the entire periphery of the end of the hollow sectioned body by:
      (i) inserting the common edge formed of the end of the hollow sectioned body and the bottom of the open bottomed recess into a welding tool comprising grooves the internal dimensions of which are matched to the external dimensions of the common edge; then
      (ii) heating the welding tool above the melting temperatures of the plastics of which the hollow sectioned body and the molded body are formed; then
      (iii) applying sufficient pressure from the tool to the edges inserted in the grooves to achieve weldings; then
      (iv) cooling the end of the hollow sectioned body and the bottom of the open bottomed recess beneath the melting temperatures of the plastics of which they are formed; and then
      (v) separating the welding tool and the welded together end of the hollow sectioned body and the bottom of the open bottom recess.

2. A process as recited in claim 1 wherein a plurality of hollow sectioned bodies are welded to the molded body simultaneously.

3. A process for connecting a hollow sectioned body made of thermoplastic to a molded body made of thermoplastic weldable to the hollow sectioned body and having an open bottomed recess having a constant cross section and having a cantilevered edge projecting from the wall of the molded body, the inside dimensions of the open bottomed recess at least approximately matching the outside dimensions of an end of the hollow sectioned body having a constant cross section, said process comprising the steps of:
   (a) introducing the end of the hollow sectioned body into the open bottomed recess in the molded body so that:
      (i) the end of the hollow sectioned body forms a common edge with the open bottom of the open bottomed recess and
      (ii) the external periphery of the end of the hollow sectioned body at least approximately matches the internal periphery of the open bottomed recess; and then
   (b) welding the end of the hollow sectioned body and the bottom of the open bottomed recess together around the entire periphery of the end of the hollow sectioned body by:
      (i) inserting the common edge formed of the end of the hollow sectioned body and the bottom of the open bottomed recess into a welding tool comprising grooves the internal dimensions of which are matched to the external dimensions of the common edge; then
      (ii) heating the welding tool above the melting temperatures of the plastics of which the hollow section body and the molded body are formed; then
      (iii) applying sufficient pressure from the tool to the edges inserted in the grooves to achieve weldings; then
      (iv) cooling the end of the hollow section body and the bottom of the open bottomed recess beneath the melting temperatures of the plastics of which they are formed; and then
      (v) separating the welding tool and the welded together end of the hollow section body and the bottom of the open bottomed recess.

4. A process as recited in claim 3 wherein a plurality of hollow sectioned bodies are welded to the molded body simultaneously.

5. A process for connecting a hollow sectioned body made of thermoplastic to a molded body made of thermoplastic weldable to the hollow sectioned body and having an open bottomed recess having a constant cross section and having a cantilevered edge projecting from the wall of the molded body, the inside dimensions of the open bottomed recess at least approximately matching the outside dimensions of an end of the hollow sectioned body having a constant cross section, said end of the hollow sectioned body being introduced into the open bottomed recess in the molded body so that the end of the hollow sectioned body forms a common edge with the open bottom of the open bottomed recess and the external periphery of the end of the hollow sectioned body at least approximately matches the internal periphery of the open bottomed recess, said process comprising the step of:
   welding the end of the hollow sectioned body and the bottom of the open bottomed recess together around the entire periphery of the end of the hollow sectioned body by:
      (a) inserting the common edge formed of the end of the hollow sectioned body and the bottom of the open bottomed recess into a welding tool comprising grooves the internal dimensions of which are matched to the external dimensions of the common edge; then
      (b) heating the welding tool above the melting temperatures of the plastics of which the hollow section body and the molded body are formed; then
      (c) applying sufficient pressure from the tool to the edges inserted in the grooves to achieve weldings; then
      (d) cooling the end of the hollow section body and the bottom of the open bottomed recess beneath the melting temperatures of the plastics of which they are formed; and then (e) separating the welding tool and the welded together end of the hollow section body and the bottom of the open bottomed recess.

6. A process as recited in claim 5 wherein a plurality of hollow sectioned bodies are welded to the molded body simultaneously.

7. A process as recited in claim 1 wherein a welding tool is used the grooves of which on the entry side:

(a) are somewhat wider than on the base and (b) are slightly broader than the common edge to be inserted in step (c)(i) of claim 1.

8. A process as recited in claim 1 wherein:

(a) the hollow sectioned body comprises a block comprising a multiplicity of hollow sectioned elements previously welded or glued to one another on the front side and (b) the hollow sectioned body is connected to the molded body in the area of its outside edge.

9. A process as recited in claim 3 wherein a welding tool is used the grooves of which on the entry side:

(a) are somewhat wider than on the base and (b) are slightly broader than the common edge to be inserted in step (b)(i) of claim 3.

10. A process as recited in claim 3 wherein:

(a) the hollow sectioned body comprises a block comprising a multiplicity of hollow sectioned elements previously welded or glued to one another on the front side and (b) the hollow sectioned body is connected to the molded body in the area of its outside edge.

11. A process as recited in claim 5 wherein a welding tool is used the grooves of which on the entry side:

(a) are somewhat wider than on the base and (b) are slightly broader than the common edge to be inserted in step (a) of claim 5.

12. A process as recited in claim 5 wherein:

(a) the hollow sectioned body comprises a block comprising a multiplicity of hollow sectioned elements previously welded or glued to one another on the front side and (b) the hollow sectioned body is connected to the molded body in the area of its outside edge.

* * * * *